United States Patent [19]

Wakabayashi et al.

[11] Patent Number: 5,537,182
[45] Date of Patent: Jul. 16, 1996

[54] CAMERA WITH VIBRATION DETECTION AND CORRECTION UNITS AND A DISPLAY FOR DETERMINING VIBRATION AMOUNT

[75] Inventors: Hiroshi Wakabayashi, Yokohama; Hidenori Miyamoto, Urayasu, both of Japan

[73] Assignee: Nikon Corporation, Tokyo, Japan

[21] Appl. No.: 337,370

[22] Filed: Nov. 8, 1994

[30] Foreign Application Priority Data

Nov. 8, 1993 [JP] Japan .................................. 5-277226
Nov. 8, 1993 [JP] Japan .................................. 5-277227

[51] Int. Cl.$^6$ .................................................. G03B 7/00
[52] U.S. Cl. ........................... 354/410; 354/430; 354/471
[58] Field of Search ..................... 354/70, 195.1, 354/202, 289.1, 410, 430, 484, 471; 348/208

[56] References Cited

U.S. PATENT DOCUMENTS

5,175,580 12/1992 Shiomi ..................................... 354/410

Primary Examiner—Howard B. Blankenship

[57] ABSTRACT

A camera having a vibration detection unit to detect the amount of vibration of a camera body and a vibration correction unit to compensate for the amount of vibration detected. The vibration detection unit requires a predetermined amount of time to determine the amount of vibration. If a user desires to take a photograph before the completion of the predetermined amount of time, the photograph will be taken without operation of the vibration correction unit. If the user desires to take a photograph after the completion of the predetermined amount of time, the vibration correction unit corrects for the vibration and, then, the photograph is taken. In addition, while the vibration correction unit is determining the amount of vibration, a display lamp blinks (a first state) and once the vibration detection unit has completed its performance, the display lamp continuously shines (a second state). Further, an indication may be given that the amount of vibration that has been determined is above a maximum value, thereby making the user aware that upper compensation of the vibration is not possible.

6 Claims, 7 Drawing Sheets

CAMERA WITH VIBRATION DETECTION AND CORRECTION UNITS AND A DISPLAY FOR DETERMINING VIBRATION AMOUNT

BACKGROUND OF THE INVENTION

1. Field of the Invention

The present invention relates to a camera having a vibration detection unit and a vibration correcting unit which corrects for the vibration of a camera under certain circumstances such that image vibration (the blurring of an image on an image plane) does not occur, and more particularly, to a camera which compensates for vibration of the camera and displays various states of the camera prior to the taking of a photograph and method of using the same.

2. Description of the Related Art

Cameras are known which have a vibration detection unit for detecting an amount of vibration of a camera body, the vibration detection unit being started by the operation of a half depression of a release button. Due to the operation and mechanism of the vibration detection unit, a predetermined time is required for reaching a predetermined performance, such as detecting the amount of vibration of the camera body.

One problem that occurs is that because the release action is performed after the vibration detection, a chance of taking a photograph may be missed before the vibration detection unit reaches the predetermined performance, and the ability to take snapshots is limited as a result.

In these known cameras, after the predetermined time has elapsed, a lamp (LED) close to the viewfinder window on a back surface of the camera body blinks or shines as a warning display.

However, a problem fiat occurs with these known cameras is that during the interval up until the predetermined time, the lamp does not blink or continuously shine and the photographer has the misconception that a vibration state of the camera body is small and correctable. After the predetermined time has elapsed, the lamp blinks or shines and an erroneous photographic action is performed, and as a result, there is an apprehension that photography would be performed in a state where vibration correction is impossible.

SUMMARY OF THE INVENTION

The present invention, takes into account the abovementioned problems, and accordingly, it is an object of the present invention to provide a camera with vibration detection and correction units, the camera having a superior ability to take snapshots, wherein the chance of taking a photograph is not missed. The camera can take snapshots even before the vibration detection unit reaches the predetermined performance.

It is another object of the present invention to provide a camera with vibration detection and correction units, wherein a display indicates when vibration correction is possible so that the photographer does not erroneously take photographs for which vibration correction is impossible.

Additional objects and advantages of the invention will be set forth in part in the description which follows, and, in part, will be obvious from the description, or may be learned by practice of the invention.

The foregoing objects of the present invention are achieved by a camera having a vibration detection unit which is started by a first operation and which, after a predetermined time has elapsed, reaches a predetermined performance and detects the amount of vibration of a camera body of the camera, and a vibration correction unit for correcting the vibration determined by the vibration detection unit.

In such a camera, before the vibration detection unit reaches the predetermined performance, a release action, resulting in a photograph being taken, is immediately performed when a second operation is performed.

The vibration detection unit is started by the first operation which, for example, is a half depression of a release button. When a second operation, for example, a full depression of the release button, is performed before the vibration detection unit has reached a predetermined performance, the release action is immediately performed, and the chances of taking photographs are not missed. In addition, snapshot performance can also be excellent.

The embodiments of the present invention, however, are not limited to a half depression of the release button as the first operation, and a full depression of the release button as the second operation.

The above objects of the present invention are further achieved by a camera having a vibration detection unit, such as a sensor contained in a lens, for detecting an amount of vibration of the camera body, a detection control unit, containing an operating member, for starting the vibration detection unit via the operation of the operating member, and a display control unit including a display unit. When the vibration detection unit begins detecting the amount of vibration of the camera body, the display control unit causes the display unit to display a first state and when the vibration detection unit detects vibration smaller than a predetermined amount, the display control unit causes the display unit to display a second state different than the first state.

After the vibration detection unit begins detecting the amount of vibration of the camera body, the display control unit causes the display unit to display a first state such that the photographer, confirming the first state, can avoid taking a photograph at this time. After the predetermined time has elapsed, the display control unit causes the display unit to display the second state when the detected vibration amount is smaller than a predetermined amount. As a result, the photographer can judge that the vibration amount is within a range which can be corrected by the camera and thus can perform photography.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals referred to like elements throughout.

Figure 1:
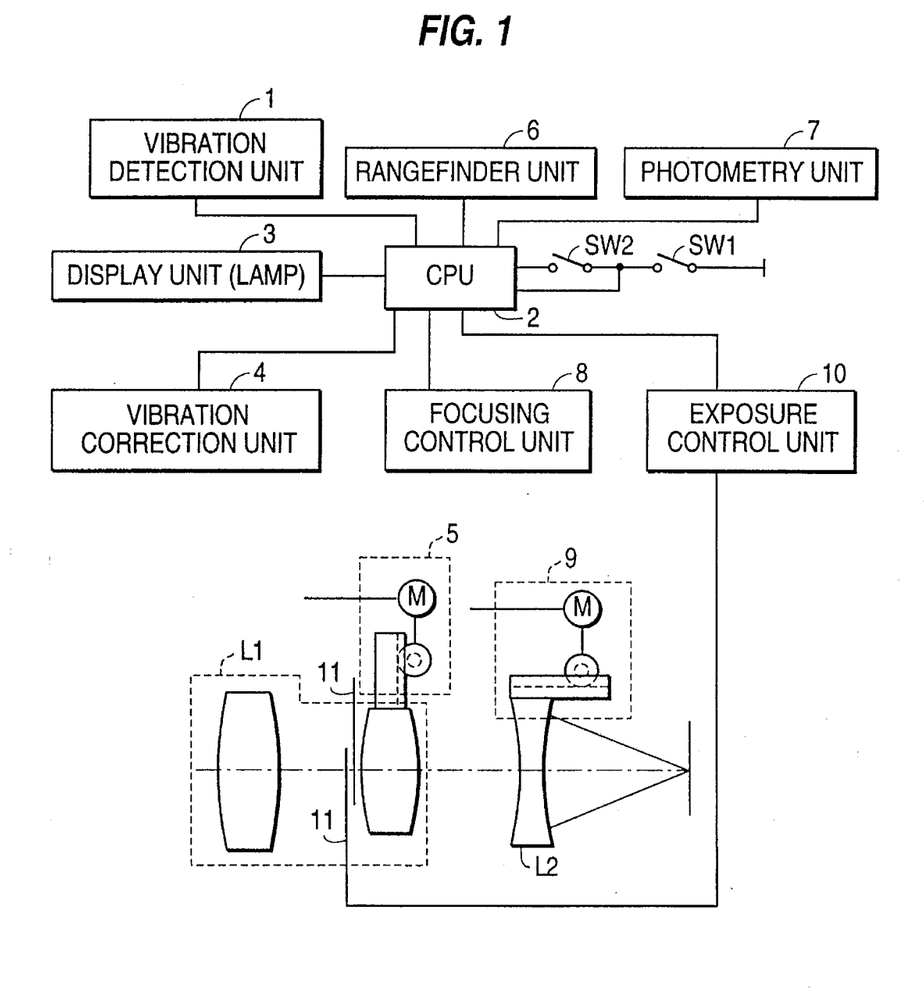
FIG 1 is a block diagram showing an internal structure of a camera according to an embodiment of the present invention.

FIG. 1 is a block diagram showing an internal structure of a camera according to an embodiment of the present invention. By a half depression operation of a release button on the camera body, not shown in the drawing, a half depression switch SW1 is set ON, and a CPU 2 causes vibration detection unit 1 to begin operation and after a predetermined time has elapsed, the vibration detection unit 1 reaches a predetermined performance, determining an amount of vibration of the camera body.

Display unit 3 is a green lamp within the viewfinder. Through an output signal of the vibration detection unit 1, the CPU 2 causes the lamp 3 to either blink or shine continuously. By performing a half depression of the release button (initiation unit), the CPU 2 starts the operation of the vibration detection unit 1, and in addition, causes the lamp 3 to blink in a first state. After the predetermined time has elapsed, the vibration detection unit 1 detects the vibration amount of the camera body and, in addition, the CPU 2 causes the lamp 3 to shine continuously in a second state. The photographer can determine whether or not conditions are suitable for photography based on the blinking or shining of the lamp 3.

Moreover, the display unit may not be a green lamp within the viewfinder, but instead, may be a lamp arranged on a back surface of the camera body and located close to the viewfinder window.

Switch SW2 is set ON by a full depression of the release button, and the CPU 2 instructs vibration correction unit 4 to make a correction according to the detection (vibration amount) of the vibration detection unit 1. The vibration correction unit 4 drives a drive system 5 of one portion of the photographic optical system L1, shifting the one portion of the photographic system L1 in an upward or downward direction, and by this drive, correction is performed of the blur of the image on the image plane, the blur being caused by vibration of the camera body.

Rangefinder unit 6 and photometry unit 7 are well known. By the half depression operation of the release button, the CPU 2 causes the rangefinder unit 6 and the photometry unit 7 to start operation, and due to this start, the rangefinding unit 6 and the photometry unit 7 carry out rangefinding and photometry, respectively.

According to the output signal (rangefinding result) of the rangefinder unit 6, the CPU 2 instructs the focusing control unit 8 to perform autofocusing (automatic focusing). Based upon this instruction, the focusing control unit 8, via a drive system 9 of a focus optical system L2, drives the focusing optical system L2 and, as a result, autofocus is performed.

According to an output signal (photometric result) of the photometry unit 7, the CPU 2 instructs exposure control unit 10 to control a stop corresponding to a stop value, and by this instruction, the exposure control unit 10 controls the driving of a stop member 11, thereby performing exposure control.

Figure 2:
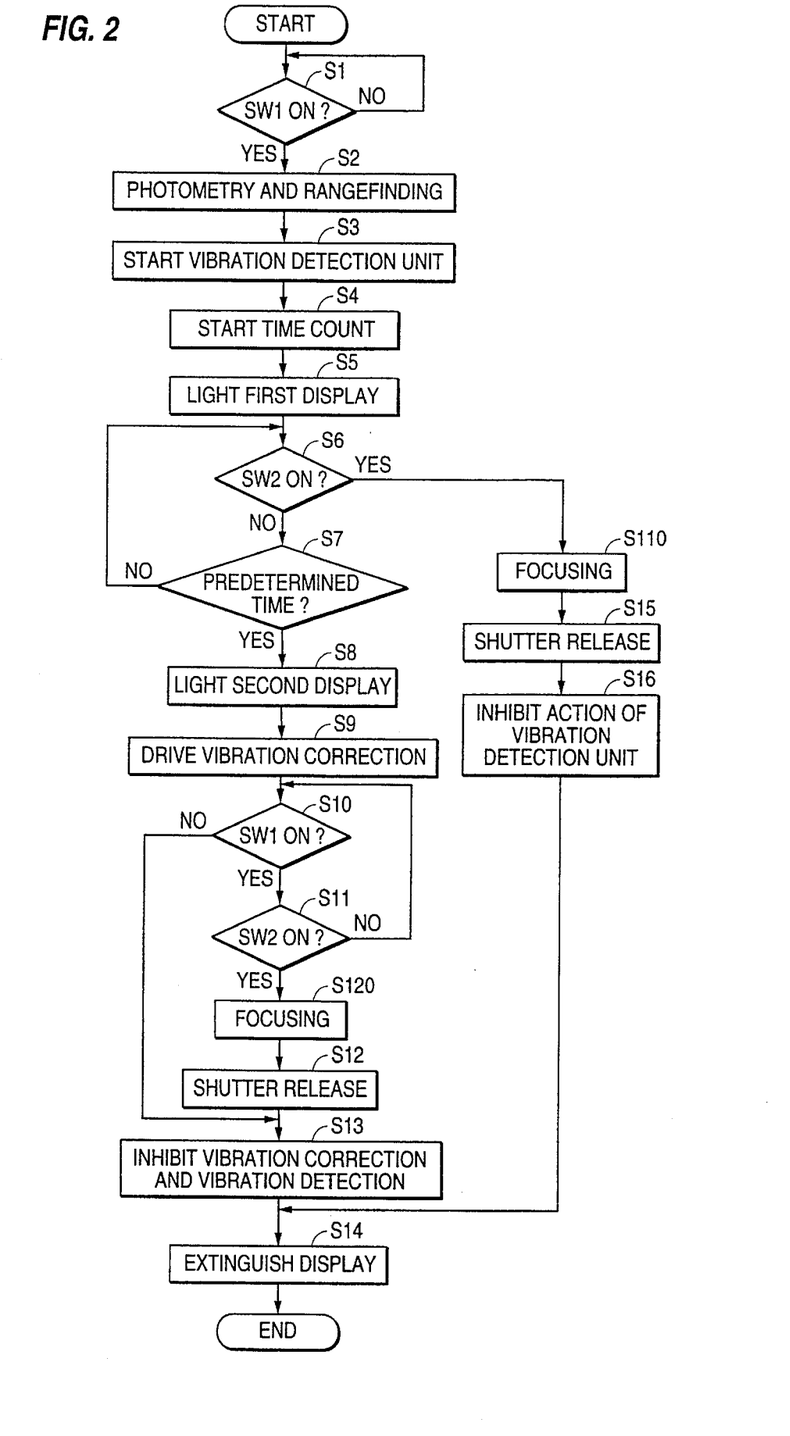
FIG. 2 is a flow chart showing an action sequence of the CPU 2 in FIG. 1 in accordance with a first embodiment of the present invention.

FIG. 2 is a flow chart of an operational or action sequence of the CPU 2 in FIG. 1 according to a first embodiment of the invention. The action of the structure of FIG. 1 now will be described with reference to FIG. 2. Firstly, in the state in which the power supply switch of the camera body has been set ON, when the release button is half depressed, switch SW1 is set ON. The CPU advances from step S1 in FIG. 2 to step S2, where the rangefinder unit 6 and photometry unit 7 are caused to start, and rangefinding and photometry are performed due to this start.

Next, proceeding to step S3, the CPU 2 causes starting of the vibration detection unit 1. Proceeding to step S4, the CPU 2 counts the time from the start of operation of the vibration detection unit 1 until a predetermined time. In step S5, the CPU 2 causes the lamp 3 to blink in a first state and next, proceeding to step S6, checks whether or not the release button has been fully depressed.

In step S6, when the operation of full depression of the release button has been performed, the full depression switch SW2 is set ON, and the CPU 2 proceeds to step S110. In step S110, the vibration correction action remains unperformed and, based on the result of the rangefinding, the CPU 2 issues an instruction for autofocusing to the focusing control unit 8, performs autofocusing by the focusing control of the focus optical system L2, and proceeds to step S15. In step S15, based on the result of the photometry, the CPU 2 issues another instruction to the exposure control unit 10. The release action is commenced by exposure control of the stop member 11 due to the exposure control unit 10. As a result of the release action, a photograph is taken.

In this case, because the full depression switch becomes ON before the vibration detection unit 1 completes the predetermined performance, the CPU 2 does not actuate the vibration correction unit 4 or the drive system 5. Based on the fact that the detection unit 1 has not completed the detection of the vibration, the vibration correction unit 4 and the drive system 5 do not act. Therefore, the action of the vibration detection unit 1, the vibration correction unit 4 or the drive system 5, does not lead to adverse effects on the taking of a photograph.

When the release action is complete, the CPU 2 proceeds to step S16. In step S16, the CPU 2 causes inhibition of the action of the vibration detection unit 1, and proceeds to step S14. In step S14, the lamp 3 is extinguished in response to an instruction from the CPU 2. After this, the CPU 2 ends its action.

If, in the time following the half depression operation there is no full depression of the release button, then the CPU 2 proceeds from step S6 to step S7, and the CPU 2 determines whether or not the time count has elapsed a predetermined time. If the predetermined time has not been reached, the CPU 2 repeats steps S6 and S7 until it has been reached.

Furthermore, when the predetermined time has elapsed, the vibration detection unit 1 reaches the predetermined performance and detects the vibration amount of the camera body. In addition, the CPU 2, proceeding to step S8, causes the lamp 3 to shine continuously in a second state. During this shining, proceeding to step S9, the CPU 2 instructs the vibration correction unit 4 to perform vibration correction based on the detected vibration amount of the camera body, wherein the blur correction unit 4 controls the drive system 5 to drive one portion of the photographic optical system L1.

The drive system 5 shifts the one portion of the optical system L1 in an upward or downward direction, thereby causing the photographic optical system L1 to correct blur of the image on the image plane.

During this correction, when the half depression operation of the release button is cancelled, the half depression switch SW1 is set OFF, and the CPU 2 proceeds from step S10 to step S13. In step S13, inhibition is caused of the action of the vibration detection unit 1 and the vibration correction unit 4. Due to this inhibition, the vibration correction drive and the detection of the amount of vibration are inhibited, and the routine proceeds to step S14. In step S14, the lamp 3 is extinguished by the instructions from the CPU 2, after which, the action of the CPU 2 ends.

Moreover, in step S10, when the half depression switch SW1 is ON, the CPU 2 proceeds to step S11. In step S11, it is determined whether or not the full depression switch SW2 has been set ON. When the full depression switch SW2 has not been set ON, the action is to repeat step S10 and step S11.

In step S11, when the full depression switch SW2 has been set ON, the routing proceeds to step S120. In step S120, based on the result of the rangefinding, the CPU 2 issues an instruction to the focusing control unit 8 for autofocusing, and autofocusing is performed by the focusing control of the focus optical system L2, and the routing proceeds to step S12. In step S12, based on the result of the photometry, the CPU 2 issues an instruction to exposure control unit 10. Due to the exposure control of the stop member 11 by the exposure control unit 10, the release action is commenced. The taking of a photograph is performed by this action, after which, the CPU 2 proceeds to step S13. In step S13, similar to the above, the action of the vibration detection unit 1 and of the vibration correction unit 4 is inhibited. Due to this inhibition, the drive of the vibration correction and the detection of the vibration amount are inhibited, and the routine proceeds to step S14. In step S14, the lamp 3 is extinguished by an instruction of the CPU 2, and after this, the action of the CPU 2 ends.

Figure 3:
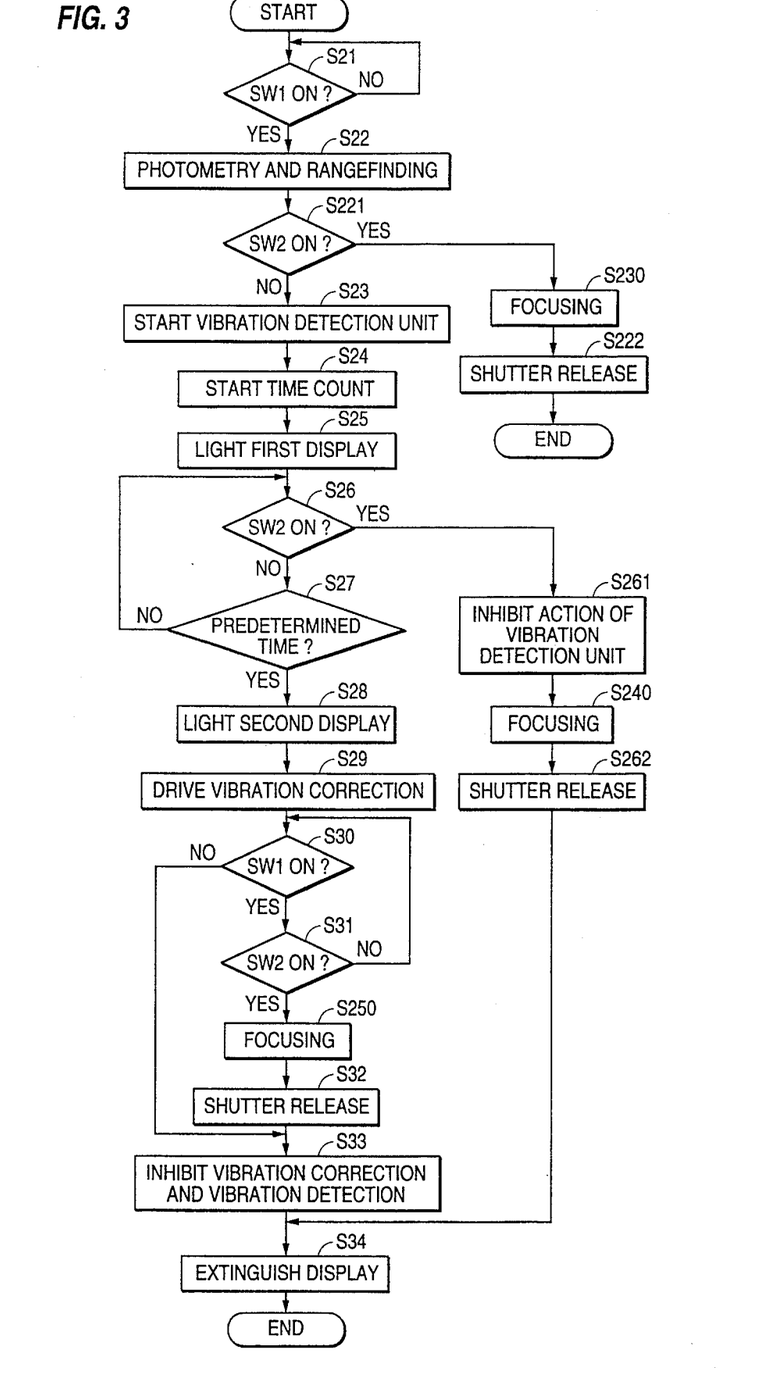
FIG. 3 is a flow chart showing the action sequence of the CPU 2 in FIG. 1 in accordance with a second embodiment of the present invention.

FIG. 3 is a flow chart of the operational or action sequence of the CPU 2 in FIG. 1 according to a second embodiment of the invention. Firstly, in response to the half depression switch SW1 being set ON by the operation of a half depression of the camera release button, similar to the first embodiment, the CPU 2 proceeds from the step S21 to step S22, causing the rangefinder unit 6 and the photometry unit 7 to start operation. Photometry and rangefinding operations are then performed.

The CPU 2 proceeds from step S22 to step S221. In step S221, it is determined whether or not the full depression switch SW2 has been set ON. When the full depression switch SW2 has been set ON, the CPU 2 proceeds to step S230. In step S230, based on the result of the rangefinding, the CPU 2 issues instructions for autofocusing by the focusing control unit 8, wherein the autofocusing is performed by the focusing control of the focusing optical system L2, and the routine proceeds to step S222. In step S222, based on the result of the photometry, the CPU 2 commences the release action by exposure control of the stop member 11 due to the exposure control unit 10. As a result, the taking of a photograph is performed, after which the action of the CPU 2 ends.

When the full depression operation is not performed, the CPU 2 proceeds from step S221 to step S23, causing the start of operation of the vibration detection unit 1. Next, proceeding to step S24, the CPU 2 counts the time and, in parallel with this count, proceeding to step S25, causes the lamp 3 to blink in a first state. Proceeding to step S26, the CPU 2 checks whether or not the release button has been fully depressed.

In step S26, when the full depression switch SW2 is ON, the CPU 2 proceeds to step S261. In step S261, the CPU 2 inhibits the action of the vibration detection unit 1, and proceeds to step S240. In step S240, based on the result of the rangefinding, the CPU 2 issues instructions for autofocusing to the focusing control unit 8, and autofocusing is performed due to the focusing control of the focusing optical system L2. The routine then proceeds to step S262. In step S262, based on the result of the photometry, the CPU 2 instructs action by the exposure control unit 10, and the release action is commenced due to exposure control of the stop member 11 by the exposure control unit 10. As a result, a photograph is taken and, after this, the CPU 2 proceeds to step S34, in step S34, the lamp 3 is extinguished due to instructions from the CPU 2, after which the action of the CPU 2 ends. It should be noted that the inhibiting action of the vibration detection unit 1, the focusing and the shutter release (steps S261, S240 and S262), may be performed in the order shown in FIG. 2 (steps S110, S15 and S16).

When the release button is not fully depressed in step S26, i.e., the full depression switch SW1 is OFF and the time count has not reached the predetermined time, the CPU 2 acts to repeat steps S26 and S27. Furthermore, when the predetermined time has been reached in step S27, because the vibration detection unit 1 has reached the predetermined performance, it has detected the vibration amount of the camera body, and the CPU 2 proceeds to step S28. In step S28, the CPU 2 causes the lamp 3 to shine continuously in a second state, and next proceeds to step S29. In step S29, the CPU 2, based on the vibration amount of the vibration detection, instructs the driving of the vibration correction by the vibration correction unit 4. The vibration correction unit 4 controls the drive system 5 of one portion of the optical system L1 to drive the one portion of the optical system L1 in an up and down direction. Due to this drive, correction is performed of the blur of the image on the image plane.

During this image vibration correction, when the half depression operation of the release button is cancelled, the half depression switch is set OFF, and the CPU 2 proceeds from step S30 to step S33. In step S33, the CPU 2 inhibits the action of the vibration detection unit 1 and the vibration correction unit 4, and next proceeds to step S34. In step S34, the lamp 3 is extinguished by an instruction from the CPU 2, and after this, the action of the CPU 2 ends.

Moreover, in step S30, when the half depression switch SW1 is ON, the CPU 2 proceeds to step S31, in step S31, it is determined whether or not the full depression switch SW2 is set ON. When the full depression switch SW2 is OFF, the CPU 2 repeats steps S30 and S31. In step S31, when the full depression switch SW2 is ON, the routine proceeds to step S250. In step S250, the CPU 2 issues an instruction for autofocus to the focusing control unit 8, and autofocusing is performed by the focusing control of the focus optical system L2, and the routine proceeds to step S32. In step S32, based on the result of the photometry, the CPU 2 instructs action by the exposure control unit 10, and the release action is commenced by exposure control of the stop member 11 due to the exposure control unit 10. The taking of a photograph is then performed by this action, after which, the CPU 2 proceeds to step S33. In step S33, the drive of the vibration correction unit 4 and the vibration detection unit 1 is inhibited, and the routine proceeds to step S34. In step S34, the lamp 3 is extinguished by an instruction from the CPU 2, and after this, the action of the CPU 2 ends.

In the first and second embodiments, shown in FIGS. 2 and 3, respectively, of the action sequence of the CPU 2, it is described that the vibration detection unit 1 is started by operation of a half depression of the release button. However, the first operation, instead of being the half depression of the release button may, for example, be the movement of a power supply switch of the camera body to the ON position. By switching ON the switch SW1 of FIG. 1 in this fashion, the CPU 2 acts similar to step S2 and thereafter in FIG. 2 or step S22 and thereafter in FIG. 3, step S6 or step S11 in FIG. 2, or step S221, step S26 or step S31 of FIG. 3. The release action can still be performed by the operation of a full depression of the release button as a second operation.

Figure 4:
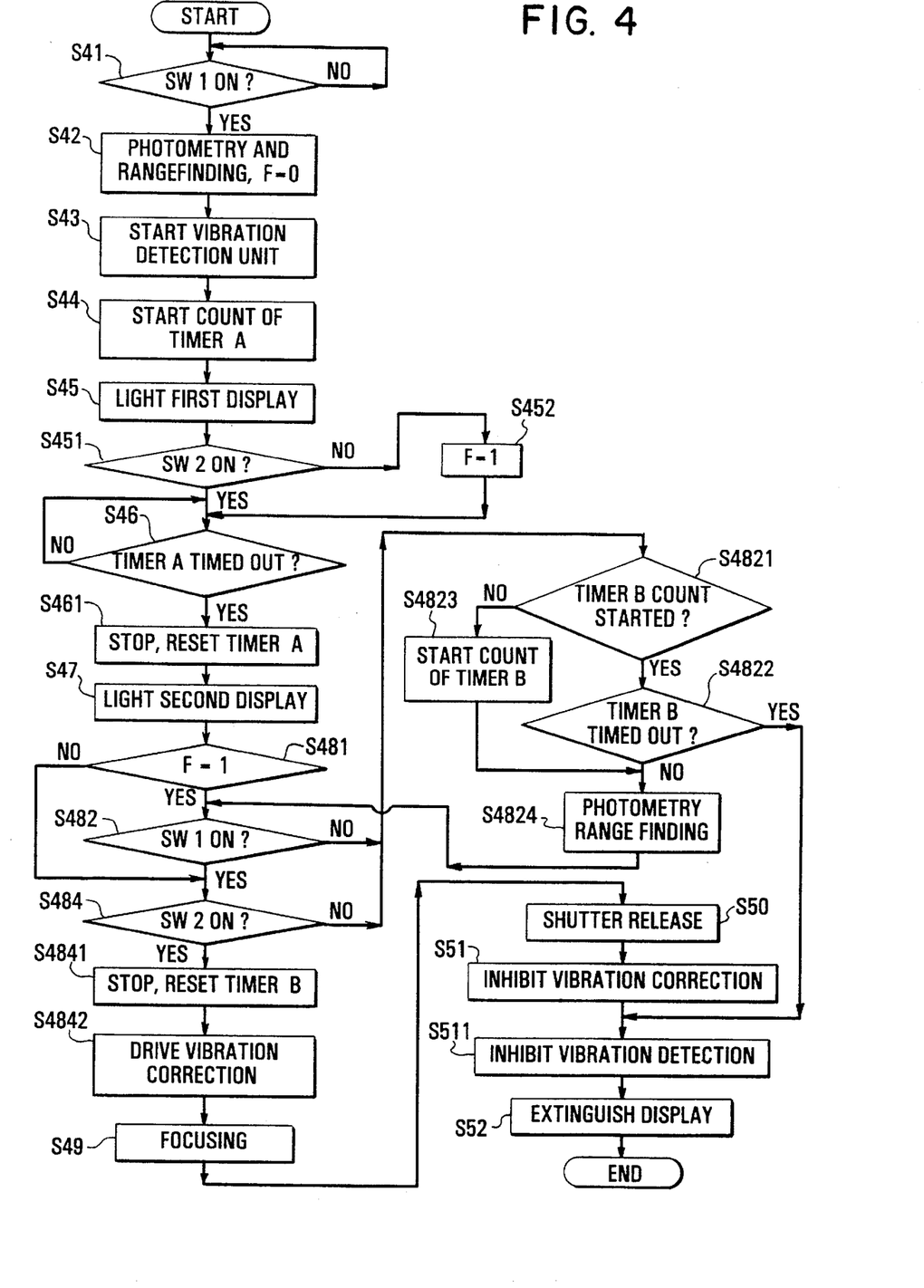
FIG. 4 is a flow chart showing the action sequence of the CPU 2 in FIG. 1 in accordance with a third embodiment of the present invention.

FIG. 4 is a flow chart, showing the operational or action sequence of the CPU 2 according to a third embodiment. In this embodiment, similar to the first and second embodiments, after the camera body power supply switch is first switched ON, through an initial half depression operation of the release button, the half depression switch SW1 is set ON, and the CPU proceeds from step S41 to step S42. In step S42, the CPU 2 starts the rangefinder unit 6 and the photometry unit 7 and, as a result, rangefinding and photometry are performed. Furthermore, a flag F is set to 0, and the CPU 2 proceeds to step S43. In step S43, the CPU 2 starts the vibration detection unit 1, and proceeds to step S44. In step S44, the count of a timer A starts and the process proceeds to step S45 during this count, in step S45, the CPU 2 causes the ramp 3 to blink in a first state, and proceeds to step S451. In step S451, a check is made as to whether or not the release button has been fully depressed. Here, when the release button has not been fully depressed and the half depression operation continues, the routine proceeds from step S451 to step S452, the CPU 2 sets the flag F from 0 to 1, and proceeds to step S46.

Moreover, in step S451, when the release button is fully depressed while the half release operation continues, the full depression switch SW2 becomes ON, and the routine proceeds from step S451 to step S46. In step S46, the CPU 2 determines whether or not the count of the timer A has reached its predetermined time. If this has not been reached, the CPU 2 repeats step S46. Here, when the count of the timer A has reached the predetermined time, the amount of vibration of the camera body has been accurately determined, the vibration detection unit reaches a predetermined performance, and vibration correction is possible. Then, the CPU 2 proceeds to step S461. In step S461, after the count of the timer A has stopped, the count of the timer A is reset, and the CPU 2 proceeds to step S47. In step S47, the CPU 2 causes the lamp 3 to shine continuously in a second state, and during this lighting, proceeds to step S481. In step S481, it is determined whether or not the flag F is 1. When the flag F is not 1, the routine proceeds to step S484. Moreover in step S481, when the flag F is 1, the routine proceeds to step S482. In step S482, it is determined whether or not the half depression switch SW1 is ON. When the half depression switch SW1 is ON, the routine proceeds to step S484. Moreover in step S482, when the half depression switch SW1 is OFF, the routine proceeds to step S4821. In step S4821, the CPU 2 determines whether or not the count of a timer B has started, and if it has not started, the CPU 2 proceeds to step S4823. In step S4823, the count of the timer B is started, and the CPU 2 proceeds to step S4824.

In step S4821, in the case that the count of the timer B has started, the CPU 2 proceeds to step S4822. In step S4822, the CPU 2 determines whether or not the timer B has reached its predetermined time, and if it has reached its predetermined time, the CPU 2 proceeds to step S511. In step S511, vibration detection is stopped, and the CPU 2 proceeds to step S52. In step S52, according to an instruction from the CPU 2, the lamp 3 is extinguished, and after this, the action of the CPU 2 ends. After the count of the timer A has reached its predetermined time, in the case that the photographer has discontinued the operation (half depression switch SW1 having been ON) of half depression of the release button, or after the count of the timer A has reached its predetermined time, the half depression operation is continued, and the photographer does not perform the full depression operation (full depression SW2 is ON), until the count of the timer B reaches its predetermined time, the operations of photometry, rangefinding, and vibration detection are continuously performed. Then, when the count of the timer B reaches its predetermined time, photometry, rangefinding and vibration detection stop, and the operation of the CPU 2 stops.

In this manner, in the case that the operation of full depression is not performed in the time until the count of the timer B reaches its predetermined time, because the CPU 2 stops operation, wasteful power consumption is prevented.

in step S4822, in the case that its predetermined time has not been reached by the timer B, the CPU 2 proceeds to step S4824. In step S4824, the CPU 2 brings about restarting of the rangefinder unit 6 and the photometry unit 7, thereby starting rangefinding and photometry, respectively. The CPU 2 then proceeds to step S482.

In step S484, it is determined whether or not the full depression switch SW2 is ON. When the full depression switch SW2 is ON, the routine proceeds to step S4841. In step S4841, the CPU 2 causes the count of the timer B to stop and resets the count of the timer B. In step S4842, the vibration correction drive is commenced, and the vibration correction unit 4 drives the drive system 5 of one portion of the photographic optical system L1, causing the one portion of the photographic optical system L1 to shift in an up and down direction. By this shifting, correction is performed of the image blur on the image plane and the CPU 2 proceeds to step S49.

In step S484, in the case that the full depression switch SW2 is OFF, the CPU 2 proceeds to step S4821. Namely, by the loop of step S4821 through step S4824 and step S484, until the full depression switch SW2 is set ON, the operations of photometry, rangefinding and vibration detection are continually performed.

In step S49, based on the result of the rangefinding, the CPU 2 issues an instruction for autofocusing to the focusing control unit 8, and autofocusing is performed by the focusing control of the focus optical system L2, and the routine proceeds to step S50. In step S50, the CPU 2, based on the result of the photometry, instructs action by the exposure control of the stop member 11 by the exposure control unit 10. As a result, the taking of a photograph is performed and, after this, the CPU 2 proceeds to step S51. In step S51, the CPU 2 inhibits the operation of the vibration correction unit 4, and due to this step, the vibration correction drive is stopped. Namely, the CPU 2 stops the vibration correction process. It then proceeds to step S511, wherein the CPU 2 causes the operation of the vibration detection unit 1 to stop, thereby stopping the detection of vibration of the camera body. Proceeding to step S52, the lamp 3 is extinguished by an instruction from CPU 2, after which, the action of the CPU 2 ends.

In this manner, as shown in FIG. 4, if the initial half depression operation continues and the full depression operation is as also performed, without fail after the passage of time for stabilization of the performance of the vibration detection unit 1 (the predetermined time counted by timer A), it is possible to take a photograph on which the effect of vibration is relatively small. This is because photography is performed while performing vibration correction, which is based on an accurately detected amount of vibration.

Figure 5:
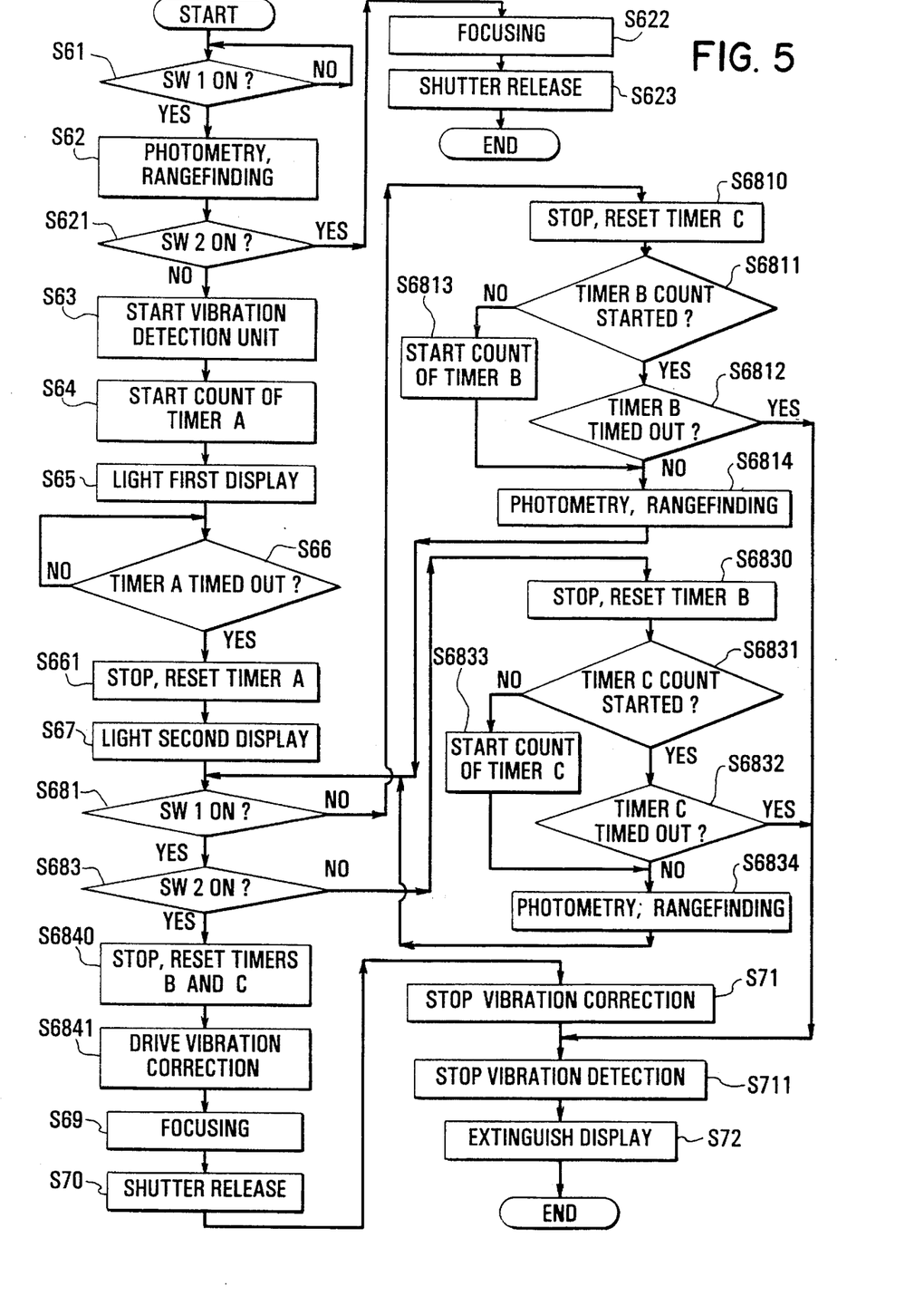
FIG. 5 is a flow chart showing the action sequence of the CPU 2 in FIG. 1 in accordance with a fourth embodiment of the present invention.

FIG. 5 is a flow chart showing the operational or action sequence of the CPU 2 in accordance with a fourth embodiment. In this embodiment, similar to the third embodiment, the camera body power supply switch is first switched ON. Due to an initial half depression operation of the release button, the half depression switch SW1 is switched ON, and the CPU proceeds from step S61 to step S62 in FIG. 5. In step S62, the CPU 2 starts the rangefinder unit 6 and the photometry unit 7 and, as a result, rangefinding and photometry are performed. The routine then proceeds to step S621. In step S621, it is determined whether or not the full depression switch SW2 is set ON. When the full depression switch SW2 is ON, the routine proceeds to step S622. In step S622, based on the result of the rangefinding, the CPU 2 issues an instruction for autofocusing to the focusing control unit 8, and autofocusing is performed by the focusing control of the focus optical system L2, and the routine proceeds to step S623. In step S623, the CPU 2, based on the result of the photometry, instructs action by the exposure control unit 10, and release action is commenced due to the exposure control of the stop member 11 by the exposure control unit 10. As a result, a photograph is taken, and after this, the action of the CPU 2 ends.

By performing steps S61 through S623, when the initial operation of half depression of the release button continues and the full depression operation (full depression switch SW2 is ON) is effected, the vibration correction process is not performed, but it is possible to complete photography.

In step S621, when the full depression switch SW2 is OFF, the CPU 2 proceeds to step S63. In step S63, the CPU 2 starts the vibration detection unit 1, and proceeds to step S64. In step S64, the CPU 2 starts the count of the timer A, and proceeds to step S65 while continuing the count. In step S65, the CPU 2 lights the lamp 3 in a first state, and proceeds to step S66. In step S66, the CPU 2 determines whether or not the time count of the timer A has reached its predetermined time. If this has not been reached, the CPU 2 repeats step S66. Here, the predetermined time of the timer A sets the time until the vibration detection unit 1 reaches its predetermined performance (completing determination of the vibration of the camera body), or the time until the vibration detection unit 1 reaches the predetermined performance plus a small margin. Then, when the time of the count of the timer A reaches the predetermined time, because the vibration detection unit 1 has reached a predetermined performance, the detection value of the vibration amount of the camera body becomes accurate. At this point vibration correction is possible. Then, the CPU 2 proceeds to step S661, wherein after the count of the timer A has stopped, the count of the, timer A is reset.

In step S67, the CPU 2 causes the lamp 3 to light in a second state, and during this lighting, proceeds to step S681. In step S681, it is detected whether or not the half depression switch SW1 is ON, and when this switch is ON, the CPU 2 proceeds to step S683. Moreover, in step S681, in the case that the half depression switch SW1 is OFF, the CPU 2 proceeds to step S6810. In step S6810, in the case that the timer C is counting, the count of the timer C is stopped and the count is then reset. Here, the timer C is a timer which is set in step S6833 and discussed below. After step S6810, the CPU 2 proceeds to step S6811, wherein the CPU 2 determines whether or not the count of the timer B has started. If the count of the timer B is not started, the CPU 2 proceeds to step S6813, and the count of the timer B is started. The CPU 2 then proceeds to step S6814.

In step S6811, in the case that the count of the timer B is started, the CPU 2 proceeds to step S6812. In step S6812, the CPU 2 determines whether or not the timer B has reached its predetermined time, and in the case that it has reached its predetermined time, the CPU 2 proceeds to step S711. Here, the predetermined time of counter B differs according to the performance of the camera, but may be set to a time similar to the well known time from when the photographer takes his finger off the release button after the operation of half depressing the release button, until the electric supply of the camera automatically goes OFF. This predetermined time is 8 seconds, but may be varied.

Then, in step S711, vibration detection is stopped and the CPU 2 proceeds to step S72. Here, in response to an instruction from the CPU 2, the lamp 3 is extinguished, and after this, the operation of the CPU 2 ends. Similar to the third embodiment, in this embodiment, in the case that the operation of full depression is not performed in the time until the count of the timer B reaches its predetermined time, because the CPU 2 stops the action, wasteful electric power consumption is prevented.

In step S6812, in the case that the time of the timer B has not been reached, the CPU 2 causes the rangefinder unit 6 and the photometry unit 7 to restart, and rangefinding and photometry are performed accordingly. The CPU 2 then proceeds to step S681, wherein in the case that the half depression switch SW1 is OFF, by the loop of step S681 and steps S6810–S6814, the count of the timer B reaches the predetermined time. Further, until the CPU 2 proceeds to step S711, the actions of photometry, rangefinding and the count of timer B are continually performed. Namely, the CPU 2 waits for the operation of half depression to be effected while the timer B counts until the predetermined time, if the timer B reaches its predetermined time, without the operation of half depression occurring, then the CPU 2 stops.

In step S681, when the half depression switch SW1 becomes ON before the timer B reaches its predetermined time, the CPU 2 proceeds to step S683. Here, it is detected whether or not the full depression switch SW2 is ON. When the full depression switch SW2 is ON, the CPU 2 proceeds to step S6840. In step S6840, the CPU 2, in the case that the timers B and C are both counting, causes the count of both timers to stop and resets the count of both timers. Then, the CPU 2 proceeds to step S6841. Moreover, in the case that neither timer is counting, the CPU 2 simply proceeds to step S6841. In the case that either one of the timers B and C are counting, the count of the counting timer is stopped, and that timer is reset. The CPU 2 then proceeds to step S6841, in step S6841, the CPU 2 commences vibration correction drive, and the vibration correction unit 4 drives the drive system 5 of one portion of the photographic optical system L1, causing the one portion to be driven in an up and down direction. By this shift drive, the correction of image blur and image plane is performed, and the CPU 2 proceeds to step S69. In this step, based on the rangefinding results, the CPU 2 emits an instruction for autofocus (automatic focus) by the focusing control unit 8, and autofocus is performed by focusing control of the focus optical system L2. In step S70, the CPU 2, based on the result of the photometry, instructs the action of the exposure control unit 10, and by exposure control of the stop member 11, shutter release is performed. The taking of a photograph is performed by this action and the CPU 2 then proceeds to step S71. Here, the action of fie vibration correction unit 4 is stopped, and through this, the vibration correction drive is stopped. The CPU 2 then proceeds to step S711, wherein it causes the action of the vibration detection unit 1 to stop, thereby stopping detection of the vibration amount of the camera body. Then, the CPU 2 proceeds to step S72, extinguishing the lamp 3 through an instruction. The CPU 2 then ends it actions. Namely, when the half depression switch SW1 and the full depression switch SW2 become ON before the timer B has reached its predetermined time, vibration correction is performed and the taking of the photograph is carried out.

In step S683, in the case that the full depression switch SW2 is OFF, the CPU 2 proceeds to step S6830. Here, if the timer B is counting, this count is stopped and reset. The CPU 2 then proceeds to step S6831, wherein the CPU 2 determines whether or not the count of timer C has started. If it has not started, the count of the timer C is started in step S6833, and the CPU 2 then proceeds to step S6834. In step S6834, the CPU 2 causes the rangefinder unit 6 and the photometry unit 7 to restart, and the CPU 2 proceeds to step S681. The actions in step S681 and the following have been discussed above and a description is omitted here.

In step S6831, in the case that the count of the timer C is started, the CPU 2 proceeds to step S6832, where the CPU 2 determines whether or not the timer C has reached its predetermined time. In the case that its predetermined time has been reached, the CPU 2 then proceeds to step S711. Here, the predetermined time of timer C varies according to the performance of the camera, but as the time is set beforehand, it is preferable to be longer than the predetermined time of timer B. In this case, the photographer continues the operation of half depressing the release button. Namely, the photographer carries out photography at will. For example, in the case that the predetermined time of timer C is set at one second, when the photographer, after exceeding two seconds, presses the release button in order to carry out photography, he cannot carry out such photography, notwithstanding the fact that the full depression switch SW2 is ON, because the CPU 2 has already stopped. Namely, the disadvantage arises in that photography is impossible because the predetermined time of timer C is short. The predetermined time of timer C is preferably set to take into account the electric power consumption of the camera, etc. For example, if the predetermined time of timer C is five minutes, in a camera having adequate battery capacity, the inconveniences such as those mentioned above do not arise in normal photography.

In step S711, the vibration detection is stopped, and the CPU 2 proceeds to step S72, wherein the lamp is extinguished based upon an instruction from the CPU 2. After this, the actions of the CPU 2 end. Namely, when the timer C reaches its predetermined time, because the CPU 2 stops while the half depression operation continues, in comparison with a camera in which the performance of photometry, rangefinding and vibration detection continues, unnecessary consumption of the battery power is prevented.

In step S6832, in the case as the timer C has not reached its predetermined time, the CPU 2 proceeds to step S6834, in step S6834, the CPU 2 restarts the rangefinder unit 6 and the photometry unit 7, and rangefinding and photometry are performed accordingly. Then, in step S681, in the case that the half depression switch SW1 is OFF, the CPU 2 proceeds to step S6810. In step S6810, because the timer C is counting, this count is stopped and then timer C is reset. Then in step S6811, the CPU 2 operates, as discussed above, by the loop of step S681 and steps S6810–S6814 and the loop of the above-mentioned step S683 and steps S6830–S6834.

Then, the half depression step SW1 and the full depression switch SW2 differ according to the conditions in each loop, but among the timer B or timer C, the CPU 2 stops at the earlier of the two predetermined times which have been reached.

Therefore, in the fourth embodiment, the initial half depression operation continues, and in the case that the full depression operation is directly performed, the vibration correction process is not performed, and photography can be completed. Accordingly, chances of taking a photograph are not lost.

By continuing the initial half depression, and waiting to perform a full depression operation until after the time required to stabilize the vibration unit 1, it is possible to perform the vibration correction process based on the accurately detected vibration amount. Therefore, photography is possible with little effect of vibration on the photograph.

Furthermore, by continuing the initial half depression operation and not carrying out a full depression operation after a predetermined time subsequent to the stabilization of the vibration detection unit 1 or in the case that the half depression operation has been cancelled and the full depression operation is not performed during the time up to the count of the timer B reaching its predetermined time, because the action of the CPU 2 is stopped, unnecessary electric power consumption is prevented.

Still further, by continuing the initial half depression operation, and waiting for the time to stabilize the vibration detection unit 1, the half depression operation and the full depression operation differ according to the conditions of each loop, within the time which has been set in each loop, because the operation of the CPU 2 is stopped by means of the timer which has first reached its predetermined time, thereby preventing unnecessary electric power consumption.

Figure 6A:
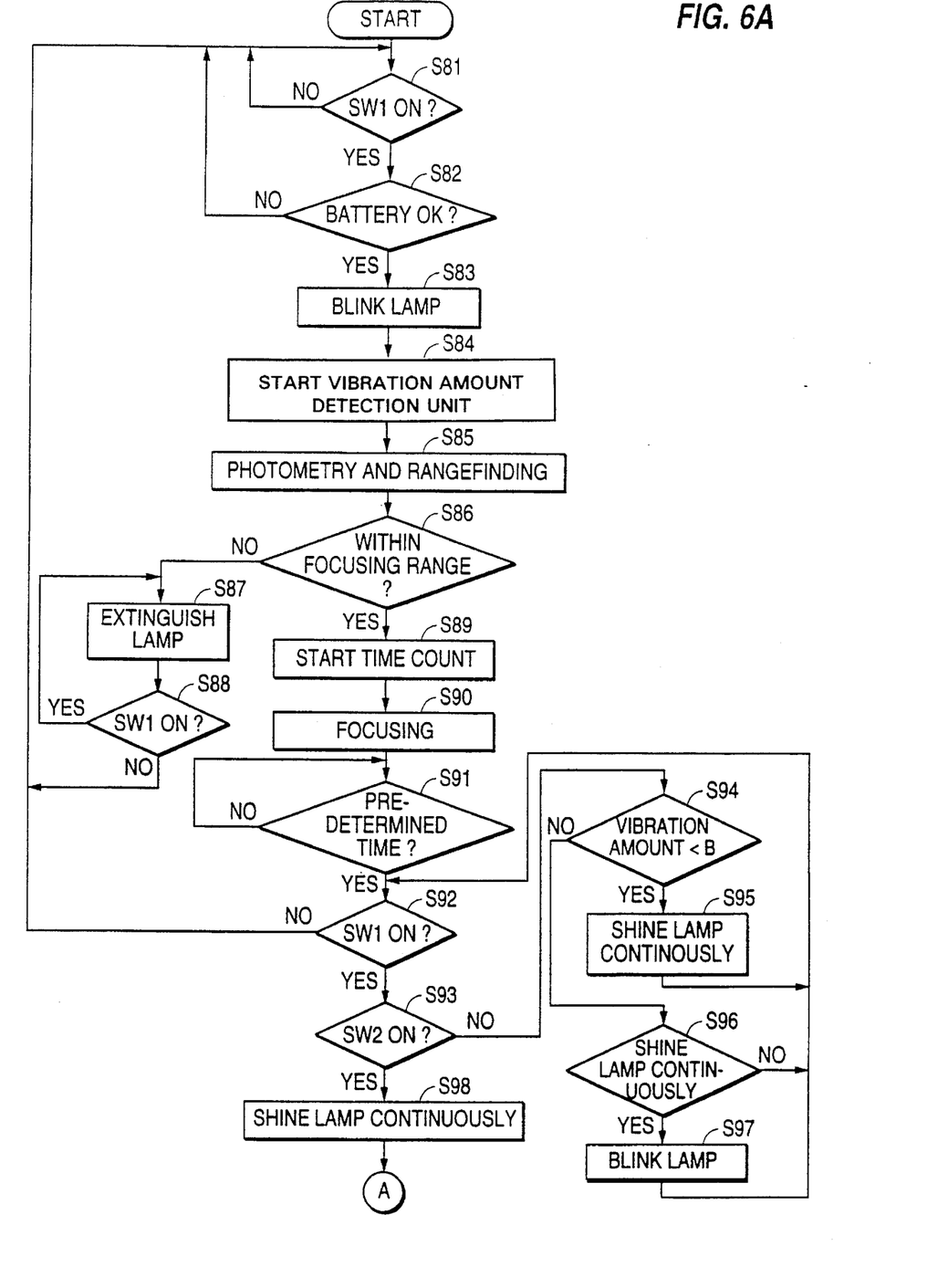
FIG. 6A is a flow chart showing the action sequence of the CPU 2 in FIG. 1 in accordance with a fifth embodiment of the present invention.
Figure 6B:
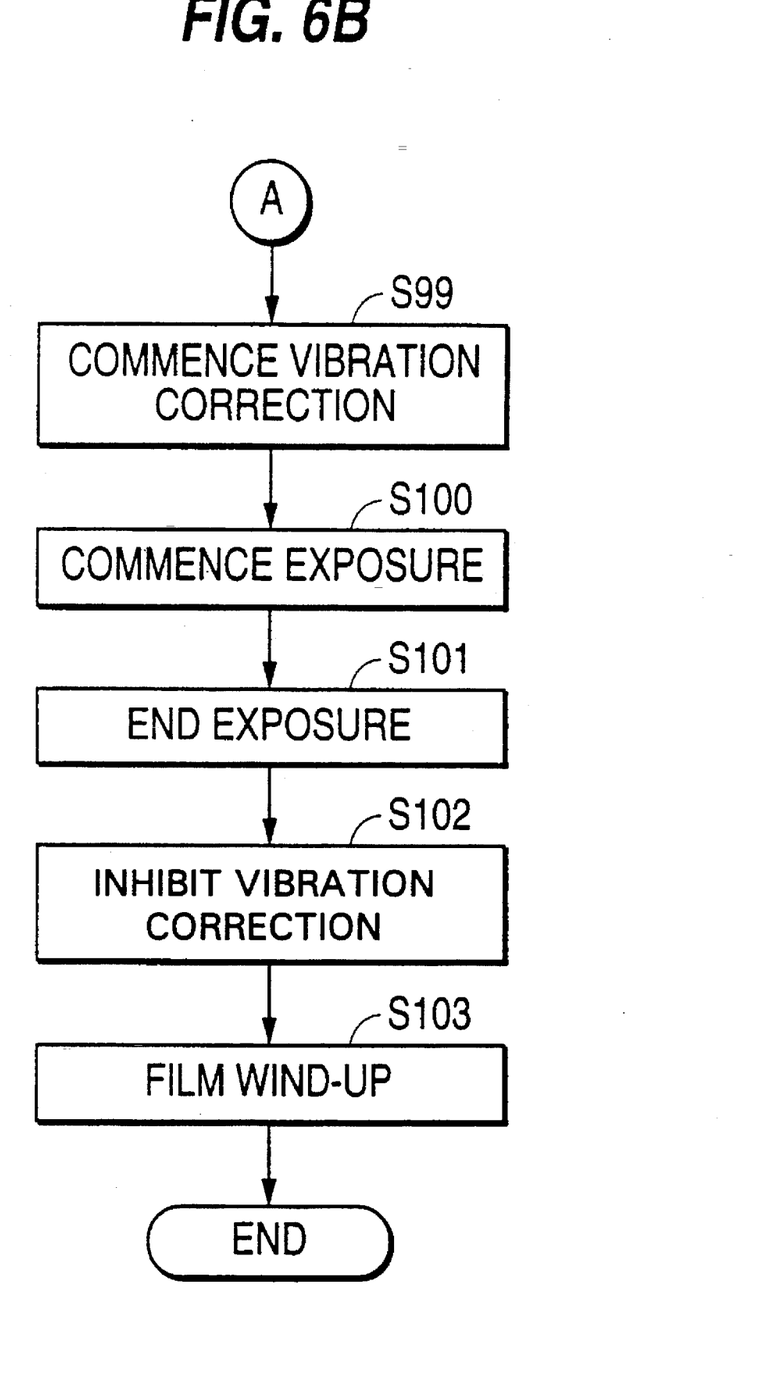
FIG. 6B is a flow chart showing the action sequence subsequent to step S98 in FIG. 6A.

FIGS. 6A and 6B are flow charts showing the operational or action sequence of the CPU 2 in FIG. 1 in accordance with a fifth embodiment of the present invention. In this embodiment, the detection control unit comprises the CPU 2, together with the release button or half depression release switch SW1. The display control unit comprises the CPU 2 and the lamp 3.

Firstly, in a state in which the power supply switch of the camera has been set ON, when the release button is half depressed, switch SW1 is set ON in step S81 and the CPU 2 advances in FIG, 6A to step S82. The CPU 2 checks whether or not the battery has run low.

When the battery is sufficient, proceeding to step S83, the CPU 2 enters the first state causing the lamp 3 to blink. In step S84, the CPU 2 starts the vibration detection unit 1 and furthermore, in step S85, the CPU 2 starts the rangefinder unit 6 and photometry unit 7, and rangefinding and photometry are performed by the respective rangefinder unit 6 and photometry unit 7.

The CPU 2 proceeds from step S85 to step S86. In step S86, based on the output of the rangefinder unit 6, the CPU 2 determines whether or not the rangefinder result is within the autofocus range Am. When the rangefinder result is outside the autofocus range Am, the CPU 2 determines that focusing is impossible, and in step S87, causes the lamp 3 to be extinguished. In step S88, the CPU 2 determines whether or not the half depression operation is continuing, thereby waiting for cancellation of the half depression operation of the release button. In the case that the half depression operation is continuing, the CPU 2 acts to repeat the loop of steps S87 and S288 until the half depression operation is discontinued. In the case that the half depression is discontinued, the CPU 2 returns to step S81.

In step S86, when the rangefinder result is within the focusing range Am, the CPU 2 determines that focusing is possible, and in addition, in step S89, counts the time. During this count, the CPU 2, in step S90, instructs the focusing control unit 8 according to the rangefinder result, and the focusing control unit 8, via the drive system 9, moves the focus optical system L2 into a focused position.

The CPU 2 proceeds from step S90 to step S91. In step S91, it is determined whether or not the time count has reached the predetermined time. If not, the CPU 2 waits until the predetermined time is reached. Moreover, in step S91, when this predetermined time has elapsed, the CPU 2 proceeds to step S92. There, when the CPU 2 has counted the predetermined time, it becomes possible to correctly detect the vibration amount of the camera body based on the results from the vibration detection unit 1. In step S92, the CPU 2 determines whether or not the half depression operation is continuing. In step S92, in the case that the half depression operation is discontinued, the CPU returns to step S91.

In step S92, in the case that the half depression operation is continuing, the CPU 2 proceeds to step S93. In step S93, the CPU 2 determines whether or not the release button has been fully depressed. In the situation that there is no full depression, the CPU 2 proceeds to step S94. In step S94, the CPU 2 determines whether or not the amount of vibration detected by the vibration detection unit 1 is smaller than a predetermined amount B. In the case that the vibration amount is smaller than the predetermined amount B, the CPU 2 proceeds to step S95, wherein the lamp 3 is caused to shine continuously in a second state. Then, the CPU 2 returns to step S92. In step S95, when the lamp 3 is in the flashing state (the first state), it changes over from the flashing state into the continuously shining state. Moreover, as is clearly shown in this flow chart, in the case that the lamp 3 is already in the continuously shining state, the continuously shining state is continued. Moreover, in step S94, when the detected vibration amount is not smaller than the predetermined amount B, namely in the case that the detected vibration amount is greater than or equal to the predetermined amount B, the CPU 2 proceeds to step S96. In step S96, it is determined whether or not the lamp 3 is shining continuously. In the case that the lamp 3 is not in the continuously shining state, namely in the case that the lamp 3 is flashing, the CPU 2 returns to step S92. In the case that the lamp 3 is continuously shining, the CPU 2 proceeds to step S97. In step S97, the lamp is changed over from the shining state to the flashing state and the CPU 2 returns to step S92.

When the CPU 2 returns from step S95 to step S92, it is determined whether the half depression operation is continuing, and if so, it returns to step S93. In step S93, in the case that the full depression has not been performed, the CPU 2 proceeds to step S94. In the case that the detected vibration amount is equal to or greater than the predetermined amount B, the CPU 2 proceeds from step S94 to step S96. In step S96, because the lamp is shining continuously, the CPU 2 proceeds to step S97. In step S97, the lamp 3 is changed over from the continuously shining state to the flashing state and the CPU 2 returns to step S92. After this, the CPU 2 acts similar to the above.

As disclosed above, when the vibration amount is smaller than the predetermined amount B, and while the lamp 3 is shining continuously, by this full depression operation of the release button, the CPU 2 proceeds from step S93 to step S98. After this, proceeding to step S99 in FIG. 6B, the CPU 2, according to the detected vibration amount, instructs the vibration correction unit 4 to correct the blur of the image.

By this instruction, the vibration correction unit 4, controlling drive system 5, causes a shift of at least a portion of the photographic optical system L1. The CPU 2 then proceeds to step S100, and according to the output (photometric result) of the photometry unit 7, instructs the exposure control unit 10 to control the stop 11.

Due to this instruction, the exposure control unit 10 controls driving of the stop member 11 according to a stop value, performing control of the exposure. A photograph is then taken by this control. Proceeding to the next step S101, the CPU 2 instructs the exposure control unit 10 to end exposure control, and furthermore, proceeding to step S102, the CPU 2 instructs the vibration correction unit 4 to stop vibration correction. Based on these instructions, the vibration control unit 4 stops the drive system 5, and vibration correction is stopped.

After this, proceeding to step S103, the CPU 2 drives the film wind-up mechanism, not shown in the drawing. The winding of one frame of film is performed by this drive, after which, the CPU 2 ends its actions.

Through the fifth embodiment shown in FIGS, 6A and 6B, when the half depression operation is continuing, the time counted by the CPU 2 reaches the predetermined time and the detected vibration amount is smaller than the predetermined amount B, the lamp 3 enters the continuously shining state. The photographer confirms this continuously shining state of the lamp 3, and carries out the operation of full depression of the release button, whereby exposure control of the stop member 11 and the correction of vibration are performed. As is clear from the present embodiment, because the correction of vibration is performed by other than the normal control of the stop member 11, clearer photographs can be obtained.

In addition, as the present embodiment reveals, when the half depression operation is continuing, the CPU 2 has counted the predetermined time, the vibration detection amount is smaller than the predetermined amount B, and also the state focus has been achieved, and when the operation of full depression of the release button is carried out, it may be such that only exposure control of the stop member 11 is performed. In this case, because the detected vibration amount is smaller than the predetermined amount B, for example, even if correction of vibration is not performed, the photographer is able to avoid greatly blurred photographs.

Moreover, in order for the CPU 2 to count the time, during the blinking of the lamp 3, the photographer himself can hold the camera securely. Because of this, after the predetermined time has elapsed, the vibration amount detection unit 1 can accurately detect the vibration amount.

Furthermore, it was disclosed hereinabove that the vibration detection unit 1 is started by the half depression operation of the release button. However, the power supply switch of the camera may be used as the operating member instead of the release button, for example. By moving this switch to the ON position, the CPU 2 may be actuated similar to FIG. 6A from step S81 to step S82 and thereafter, in step S93, by full depression of the release button, the CPU 2 can also be similarly actuated via step S98 to step S99 in FIG. 6B and thereafter.

Moreover, as an additional embodiment, by eliminating SW2 of FIG. 1 and interlocking SW1 switch with the operation of full depression of the release button, by fully depressing the release button, switch SW1 is set ON. CPU 2 acts in a manner similar to that from step S83 in FIG. 6A to step S92. When the operation of full depression is continued, the CPU 2 detects the magnitude of the vibration amount, and while detecting less than the predetermined amount B, by the instructions of the CPU 2, the lamp 3 is caused to shine for an interval of a number of seconds, and when the lamp 3 is extinguished, the CPU 2 can similarly perform step S99 and thereafter the steps of FIG. 6B.

Accordingly, in this embodiment, from step S83 and thereafter, lamp 3 is caused to blink, by changing over to the interval of a number of seconds of shining as mentioned above, and the photographer himself determines that vibration correction is possible. A lamp 3 is disclosed as the display unit, but the display unit is not limited to a lamp. For example, in the first state, characters may be displayed in the viewfinder reading "awaiting photography". Or in the second state, the characters reading "photo OK" may be displayed in the display unit in the view finder.

With the first four embodiments of the operation of the CPU 2 of the present invention, because release becomes possible even before a vibration detection unit has finished a predetermined performance, opportunities for taking photographs are not missed, and the snapshot performance can become superior. No adverse effects on photography occur, before the vibration detection unit has reached the predetermined performance during photography, because vibration correction to prevent blur of an image on an image plane is not performed.

With the fifth embodiment, through the operation of the operating member, when the vibration detection unit is started, because the first state is also displayed on the display unit, the photographer himself knows to stop photography, and this can convert a time margin in order to set up the camera. Furthermore, by the display of the second state, the photographer confirms this display, and can take a photograph without any bewilderment.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera having a photographic lens unit and an image plane, said camera comprising:

a vibration detection unit to determine an amount of vibration of the camera;

a vibration correction unit to correct for the amount of vibration and remove blur of an image on the image plane;

a detection control unit including an operating member to start operation of said vibration detection unit; and a display control unit, having a display, to show a first state on the display when the vibration detection is started, and to show a second state on the display when the amount of vibration is less than a predetermined amount.

2. The camera as claimed in claim 1, further comprising:

a photographic optical system to allow an image of an object to be photographed to reach the image plane;

said vibration correction unit correcting for the amount of vibration and removing blur of the image on the image plane by driving at least a portion of said photographic optical system.

3. The camera as claimed in claim 1, wherein when the amount of vibration is at least as great as the predetermined amount, the display continues to show the first state.

4. The camera as claimed in claim 1, wherein the first state is a blinking state and the second state is a continuously shining state.

5. The camera as claimed in claim 1, further comprising:

a battery check unit to check a level of a battery of the camera and to deactivate said vibration detection unit when the level is less than a minimum value.

6. The camera as claimed in claim 1, wherein the vibration detection is started by a first operation which is a turning on of the camera and the taking of the photograph is performed by a second operation which is a full depression of the operating member.

* * * * *